United States Patent [19]

Stocchiero

[11] Patent Number: 4,615,445
[45] Date of Patent: Oct. 7, 1986

[54] BOX MADE OF PLASTIC MATERIAL PARTICULARLY SUITED TO CONTAIN FLOPPY DISCS FOR ELECTRONIC PROCESSORS

[76] Inventor: Olimpio Stocchiero, 5 Via Kennedy, 36050 Montorso Vicentino (VI), Italy

[21] Appl. No.: 809,398

[22] Filed: Dec. 16, 1985

[30] Foreign Application Priority Data

Dec. 17, 1984 [IT] Italy .............................. 64456/84[U]

[51] Int. Cl.⁴ ..................... B65D 85/30; B65D 85/57
[52] U.S. Cl. ................... 206/444; 206/45.13; 206/45.14; 206/45.18; 206/45.23
[58] Field of Search ............... 206/444, 387, 45.13, 206/45.15, 45.16, 45.18, 45.23; 220/335, 342, 343

[56] References Cited

U.S. PATENT DOCUMENTS

| | | | |
|---|---|---|---|
| 2,762,076 | 9/1956 | Kiba | 220/343 |
| 4,356,918 | 11/1982 | Kahle et al. | 206/387 |
| 4,369,883 | 1/1983 | Stravitz | 206/387 |
| 4,449,628 | 5/1984 | Egly et al. | 206/45.18 |
| 4,478,335 | 10/1984 | Long et al. | 206/45.15 |
| 4,479,577 | 10/1984 | Eichner et al. | 206/444 |
| 4,496,050 | 1/1985 | Kirchner et al. | 206/45.15 |

Primary Examiner—William Price
Assistant Examiner—Brenda J. Ehrhardt
Attorney, Agent, or Firm—Birch, Stewart, Kolasch & Birch

[57] ABSTRACT

A box made of plastic material, particularly suited to contain floppy discs for electronic processors, consists of three elements (10, 20, 30) connected to each other by means of two hinges being in common and coaxial. One element (30) functions as a lid when the box is closed and as a support when the box is open; the other two elements (10, 20) are hinged to each and can be opened according to a certain angle, they are provided with a bottom plate consisting of two comb-shaped parts (14, 24) with rectangular teeth; the fixed angle of aperture between the two elements (10, 20) forming the useful space of the box, is obtained by the superimposition of a projection (39) being present on the end bent part of one element (10) of the box and on the corresponding indentation (26) being present on the other element (20) being connected to it.

6 Claims, 4 Drawing Figures

BOX MADE OF PLASTIC MATERIAL PARTICULARLY SUITED TO CONTAIN FLOPPY DISCS FOR ELECTRONIC PROCESSORS

BACKGROUND OF THE INVENTION

This invention realizes a box made of plastic material, particularly suited to contain floppy discs for electronic processors. There are on the market some boxes for the storage and filing of floppy discs, which usually consist of a container having the form of a parallelepiped in which some vertical separators are fixed, so as to form separate spaces for the insertion of floppy discs, which are also in the vertical position.

The container includes a lid made of plastic material connected to it by means of hinges and for opening and closing the lid on the container. These types of box are rather bulky and difficut to handle when the box is open. Besides, it has been noticed that some users prefer having separate boxes for each group of floppy discs containing homogeneous information, rather than having a box containing several groups of discs with different memorized matters.

SUMMARY OF THE INVENTION

One of the purposes of this invention is that of creating a particularly simple, easy-to-handle box, which also makes the consultation or the extraction of the discs therein contained easier.

Another purpose is that of manufacturing a box in which the two parts forming the container space can be rotated by a certain angle, the one in relation to the other, so that the material therein contained can arrange itself according to an open configuration which makes the consultation and the selection of discs easier.

Another purpose of this invention is that the open box be provided with a lid, which also functions as a support for the box itself.

The invention includes a box made of plastic material, essentially consisting of three elements, one connected to the others by means of two coaxial hinges being in common to all three of them, in which two of said elements form the container proper, while the third element functions as a lid when the box is closed, and a support for the same when it is open. Advantageously, according to the invention, each of the two elements being hinged to each other and constituting the useful space of the container, have a supporting plate in the shape of a comb with regular and parallel teeth, such that, when the box is open, the supporting plate being thus shaped appears to be practically uniform and without such openings which would allow the fall or the scattering of the discs therein contained. Said comb-like shape of the plate also keeps the bottom surface compact, when the box is closed.

The lid is also hinged on the same axis on which the two elements constituting the box rotate and its shape is such, that, besides insuring the closing of the box, it also functions as a support, when the box is open.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
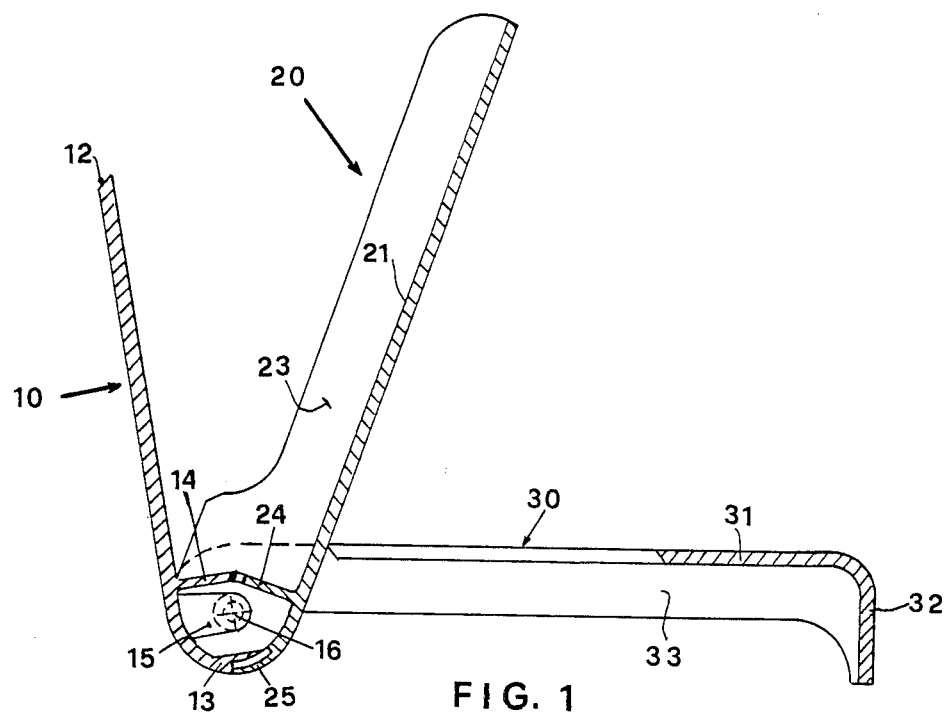
FIG. 1 shows a cross section of the box of the invention being in its open position and with the lid in its supporting position.
Figure 3:
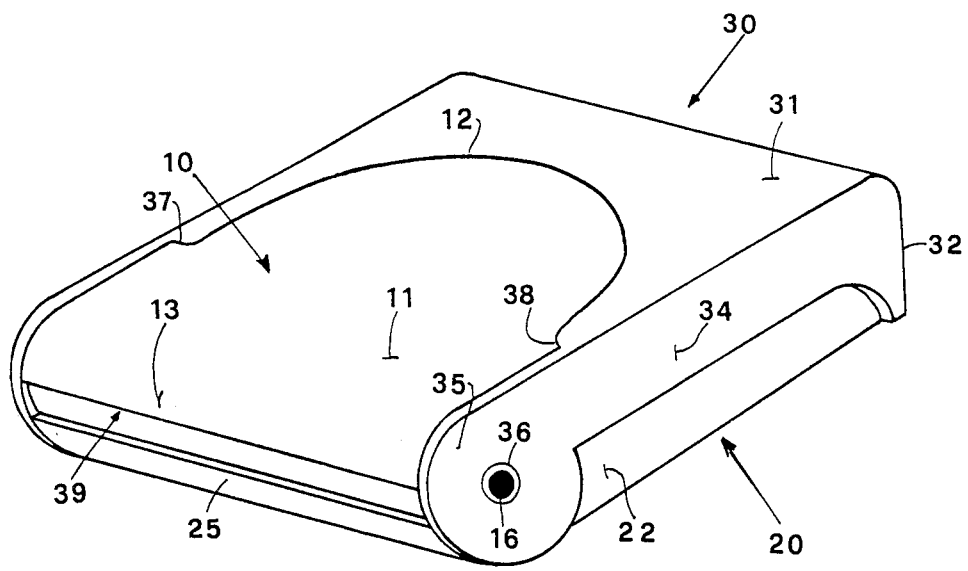
FIG. 3 is a perspective view of the closed box.

With reference to the FIGS. 1 and 3, the box consists of three elements 10, 20 and 30. In detail, the elements 10 and 20 are the two parts which form the container of the box and element 30 is the part which functions as a lid and as a support of the box.

Figure 2:
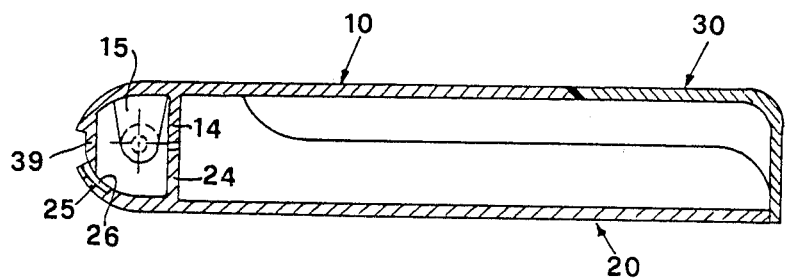
FIG. 2 shows a longitudinal cross section of the closed box.

Element 10 consists of flat wall 11 (FIG. 3 ) with a circular upper edge 12 which ends toward the bottom with a bent part 13. Said element presents a supporting shelf consisting of teeth having a rectangular profile, which constitutes part of the bottom of the box, where the edges of the discs rest when the box is open, as in FIG. 1. Said element 10 also presents at its lateral ends two slats 15, each having a pivot 16 which is inserted into a matching hole belonging to element 20. The bent part 13 of element 10 ends with a projection 39 being visible in FIG. 2, having the function of stopping the mutual rotation between the elements 10 and 20.

Element 20 is the second component of the container being connected to element 10 and it consists of a flat wall 21, two lateral sides 22 and 23 and a supporting shelf 24 having teeth with a rectangular profile, such that, together with the teeth 14 of element 10 being juxtaposed to them, they create a supporting surface which varies according to the variation of the opening angle of the two elements 10 and 20 and which lacks openings, which might jeopardize the safekeeping of floppy discs contained between the walls 11 and 21. Wall 21 ends at the bottom with a bend 25, in the inside terminal part of which there is an indentation 26 having such a thickness as to allow the housing of projection 39 present on the bent wall 13 of element 10. The superimposition of projection 39 on indentation 26 determines the maximum angular opening between the two elements 10 and 20 of the box, as can be seen in FIG. 1.

In order to make the assembly of the two elements 10 and 20 easier, some constructive expedients have been adopted which insure the maximum elasticity of the parts to be matched.

Figure 4:
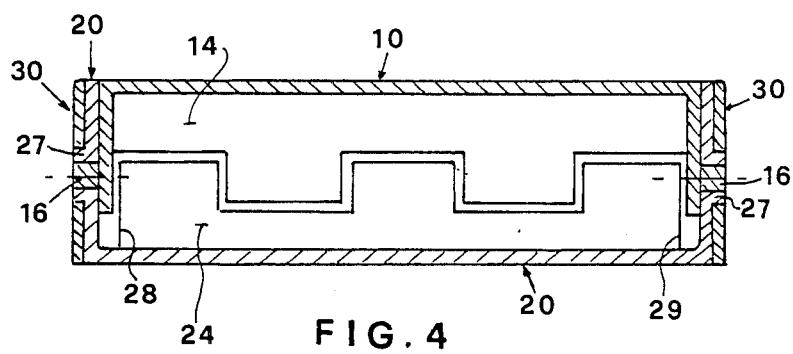
FIG. 4 is a cross section of the closed box showing the detail of the hinges.

For this reason, the slats 15 supporting the pivots 16 of element 10 have a narrow attachment base and a reduced thickness in comparison with the thickness of the elements 10 and 20. Besides, as can be seen in FIG. 4, the lateral walls of element 20 which support hub 27 are detached from the edges 28 and 29 of the comb-shaped shelf 24, thereby providing the necessary elasticity to the walls, thus making it easy to assemble the two elements 10 and 20.

Lid 30 consists of a flat wall 31 having a circular edge which, when the box is closed, matches edge 12 of element 10 and connects itself to a wall 32 being orthogonal to 31 which closes the opening of the box. The lid has two equal lateral sides 33 and 34 and their profile can be seen in FIG. 3. Each of them presents a circular terminal part 35 having a hole 36 into which hub 27 of element 20 is inserted, so that the three elements constituting the box are connected with each other.

When the box is open, lid 30 is rotated to a position to function as a support for the box, as can be seen in FIG. 1. in this position, element 20 rests in the grooves 37 and 38.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A box particularly suited to hold floppy discs for electronic processors comprising: a first, second and third element; two coaxial hinges connecting said first, second and third elements to each other, said first element functions as a lid and as a support for the box depending on whether the box is closed or open, said second and third elements forming a useful space within the box are hinged together and can be opened to a certain predetermined angle, each of said second and third elements are provided with a bottom plate shaped as a comb having rectangular, parallel and alternate teeth that constitute a supporting surface for the floppy discs contained in the box.

2. The box according to claim 1 in which the predetermined angle between said second and third elements forming the box is determined by the superimposition of a projection located on an end bent part of said second element with a corresponding indentation located in said third element.

3. The box according to claim 1, in which said two coaxial hinges include pivots, said two coaxial hinges are molded and supported by slats having a reduced thickness in comparison with an average thickness of said first, second and third elements constituting the box, to provide said slats with enough elasticity necessary for assembly.

4. The box according to claim 1 in which said third element includes lateral walls supporting a hub on which the pivots, of said two coaxial hinges, are detached from an edge of a tooth-shaped shelf for providing enough elasticity necessary for assembly of the box.

5. The box according to claim 2, in which said third element includes lateral walls supporting a hub on which the pivots, of said two coaxial hinges, are detached from an edge of a tooth-shaped shelf for providing enough elasticity necessary for assembly of the box.

6. The box according to claim 3, in which said third element includes lateral walls supporting a hub on which the pivots, of said two coaxial hinges, are detached from an edge of a tooth-shaped shelf for providing enough elasticity necessary for assembly of the box.

* * * * *